UNITED STATES PATENT OFFICE.

FREDERICK G. NIEDRINGHAUS AND WILLIAM F. NIEDRINGHAUS, OF ST. LOUIS, MISSOURI.

IMPROVEMENT IN ENAMELING SHEET-IRON WARE.

Specification forming part of Letters Patent No. 200,626, dated February 26, 1878; application filed February 15, 1878.

*To all whom it may concern:*

Be it known that we, FREDERICK G. NIEDRINGHAUS and WILLIAM F. NIEDRINGHAUS, residents of St. Louis, Missouri, have made a new and useful Improvement in Enameling Iron-Ware, of which the following is a full, clear, and exact description.

Heretofore in enameling iron-ware difficulty has been experienced in making the enamel, when fused, to entirely cover the metallic base. The enamel would separate entirely from the base in spots, causing the base to appear in the form of black specks, and the enamel throughout was not always reliably adhesive to the base.

We have ascertained in our experience as enamelers that the difficulty referred to is owing to the presence of carbon in the metallic base.

If any carbon remains therein, the following result occurs in forming the enamel: After the paste has been applied to the ware and the latter has been placed in the baking-oven, just before the fusing-point of the enamel is reached, the carbon assumes a gaseous form, and endeavors to escape from beneath the enamel. It bursts through in places, leaving the base bare, and forming the spots above described, and weakens the attachment of the enamel generally. We overcome the difficulty by thoroughly expelling the carbon from the metallic base before the application of the enameling-paste. The latter is then applied, (after the usual pickling and cleaning,) and the enamel fused in the ordinary manner.

Not only is the appearance of the enamel greatly improved, being entirely free from blemishes, but the enamel is rendered much more adhesive to the base.

The preferable mode of expelling the carbon from the metallic base is as follows: The various articles of the ware, after having been properly shaped, are inclosed with lime in a suitable box or receptacle, so as to exclude the air, and then heated nearly to a white heat, and then allowed to cool off slowly. The carbon leaves the iron during the heating and combines with the lime. The carbon, however, can be expelled from the iron when the latter is in the form of bars, and before it has been rolled into sheet-iron.

We claim—

1. The herein-described improvement in the mode of enameling iron-ware, which consists in expelling the carbon from the metallic base before the formation of the enamel thereon, for the purpose described.

2. As an improved manufacture, enameled sheet-iron ware having the enamel fused upon a decarbonized metallic base.

F. G. NIEDRINGHAUS.
WM. F. NIEDRINGHAUS.

Witnesses:
CHAS. D. MOODY,
GEO. BROWN.